Dec. 5, 1967
J. S. DIAZ
3,357,011
SYSTEM FOR AUTOMATICALLY DERIVING CODED
SIGNALS FROM A METEORLOGICAL STATION
Filed July 29, 1964
3 Sheets-Sheet 1
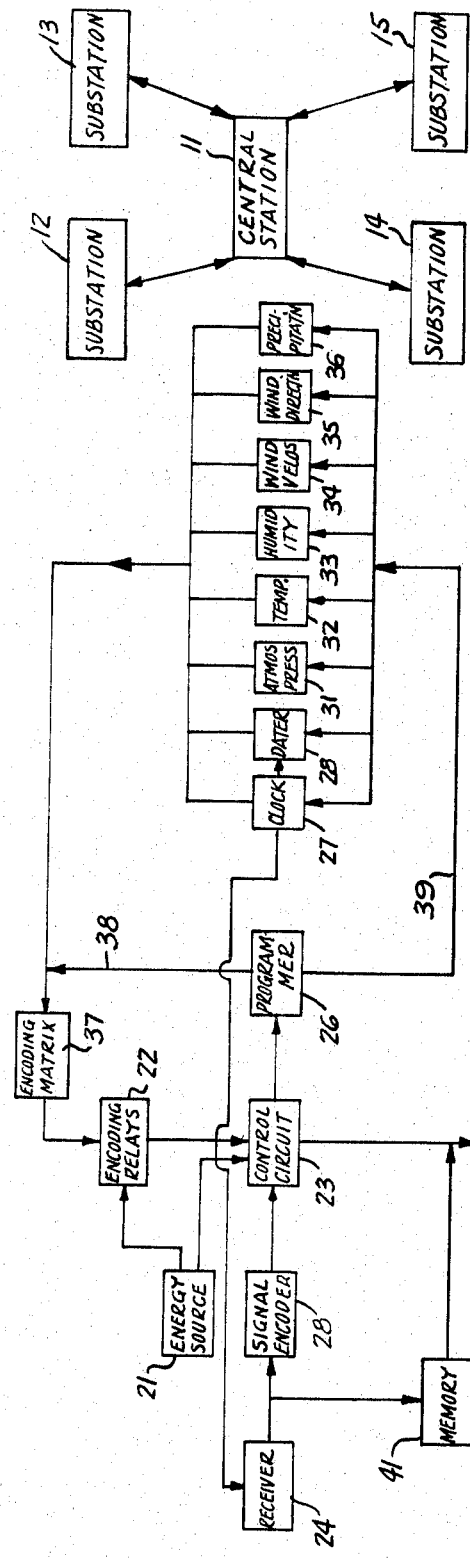
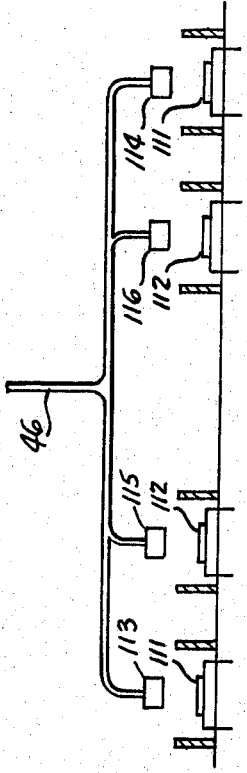
INVENTOR.
JORGE SUAREZ DIAZ
BY
Kimmel & Crowell
ATTORNEYS.

Dec. 5, 1967
J. S. DIAZ
3,357,011
SYSTEM FOR AUTOMATICALLY DERIVING CODED SIGNALS FROM A METEORLOGICAL STATION
Filed July 29, 1964
3 Sheets-Sheet 3
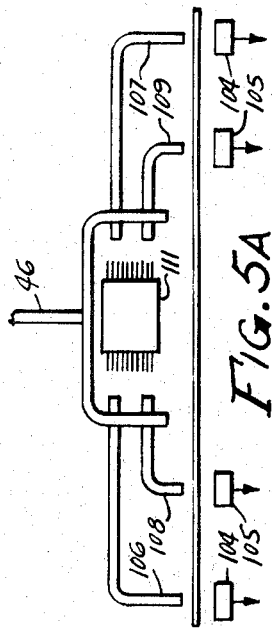
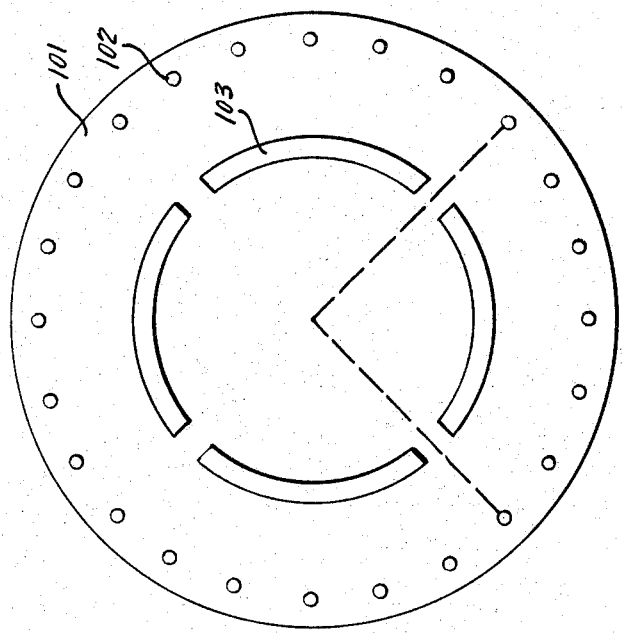
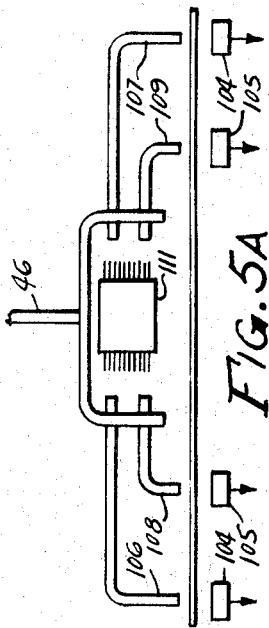
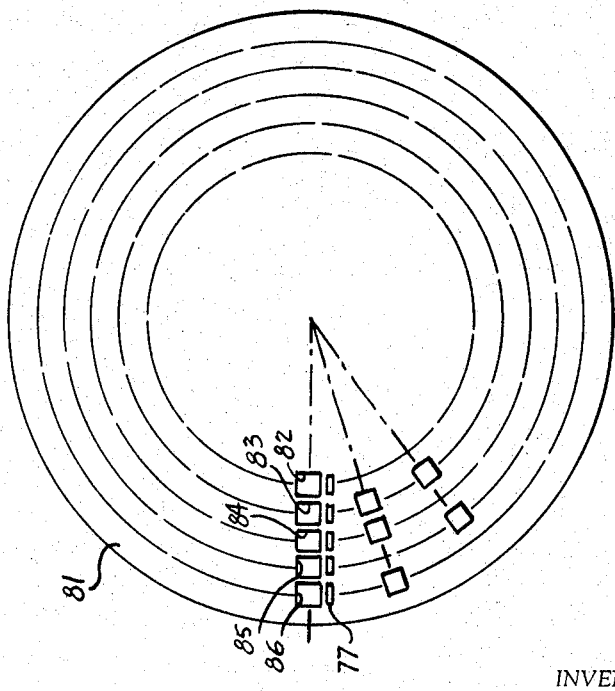
INVENTOR.
JORGE SUAREZ DIAZ
BY Kimmel & Crowell
ATTORNEYS.

United States Patent Office 3,357,011
Patented Dec. 5, 1967

3,357,011
SYSTEM FOR AUTOMATICALLY DERIVING CODED SIGNALS FROM A METEOROLOGICAL STATION
Jorge Suarez Diaz, Mexico City, Mexico, assignor to Comision de Telecomunicaciones y Meteorologia, Mexico City, Mexico, a Mexican Government institution
Filed July 29, 1964, Ser. No. 385,981
20 Claims. (Cl. 340—347)

ABSTRACT OF THE DISCLOSURE

A telemetry system for meteorological station which includes a signal encoding matrix having a plurality of sensing systems associated with rotatable shafts, the sensing systems including coded discs, a readout activating element normally spaced apart from the coded discs, and means for displacing the readout activating element and the discs from the normal position into operative relation for permitting the signal encoding matrix to derive a code signal and specific code bearing discs and readout activating elements of the mechanical contact, light sensitive and magnetically sensitive type are disclosed.

The present invention relates generally to meteorological stations employed as a transmitter in a telemetering system and more particularly to a meteorological station wherein digital data indicative of various events being monitored are automatically transmitted.

There is presently a need for providing a meteorological station that can transmit, without an attendant, digital information indicative of locally derived data, such as atmospheric pressure, temperature, humidity, wind velocity, wind direction and precipitation. The requirement for digital transmission arises because of the inherent accuracy thereof as well as the general availability of existing digital transmission means, such as telegraph lines. A problem arises in transmission of the above parameters in digital form because each of them occurs in nature as an analog quantity. To solve this problem, the most obvious approach is to utilize a multiplicity of analogue to digital converters coupled with a like number of encoders. Of course, this approach is impractical because of the great expense involved in providing plural encoders and because such encoders and converters must be operating at all times, a requirement that takes more power than is frequently available at a remote monitoring station.

The present invention provides relief from this dilemma by providing a multiplicity of analog to digital converters, each of which sequentially supplies data to a single encoding matrix. Each analogue to digital converter is selectively activated by a simple electromechanical structure that, at will, translates a readout device into operative relationship with an encoding disc. The encoding disc and readout structure can take one of several forms, namely, electrical contact, photo-electric or magnetic.

It is, accordingly, an object of the present invention to provide a telemetry system wherein data at a meteorological station is automatically transmitted to a central station in digital form.

Another object of the present invention is to provide a meteorological station for automatically deriving and transmitting digital data indicative of a plurality of analyzed parameters which occur in nature as analogue values, which station requires a single encoder for the multiplicity of analogue to digital converters utilized.

Still another object of the present invention is to provide a new and improved analogue to digital converter that is operable at will in response to a signal applied to a simple electromechanical movement associated with the converter.

A further object of the invention is to provide a meteorological station for transmitting binary information indicative of a multiplicity of parameters monitored thereat, which information can be transmitted from the station either in response to a command from a central station or at predetermined intervals, or both, as desired.

Yet a further object of the present invention is to provide a system for automatically transmitting digital data from a relatively inexpensive meteorological station that does not require excessive power.

The above and still further objects, features and advantages of the present invention will become apparent upon consideration of the following detailed description of several specific embodiments thereof, especially when taken in conjunction with the accompanying drawings wherein:

FIGURE 1 is a block diagram of a complete system embodying the concepts of the present invention;

FIGURE 2 is a block diagram of a preferred embodiment of each meteorological sub-station illustrated in FIGURE 1;

FIGURE 4 is a plan view of a rotatable disc according to a photo-electric embodiment of the analogue to digital converter of the present invention;

FIGURE 4a is a side sectional view illustrating the manner in which the disc of FIGURE 4 is utilized for reading out digital data from analogue quantities;

FIGURE 5 is a top plan view of still another embodiment of an apertured disc for use in photo-electric translation of analogue to digital quantities;

FIGURE 5a is a side sectional view illustrating the manner in which the disc of FIGURE 5 is utilized; and FIGURE 6 is a side sectional view of still another embodiment of the present invention employing magnetically responsive switches that are arranged in a topological order corresponding with the apertures illustrated in FIGURE 5.

Figure 3:
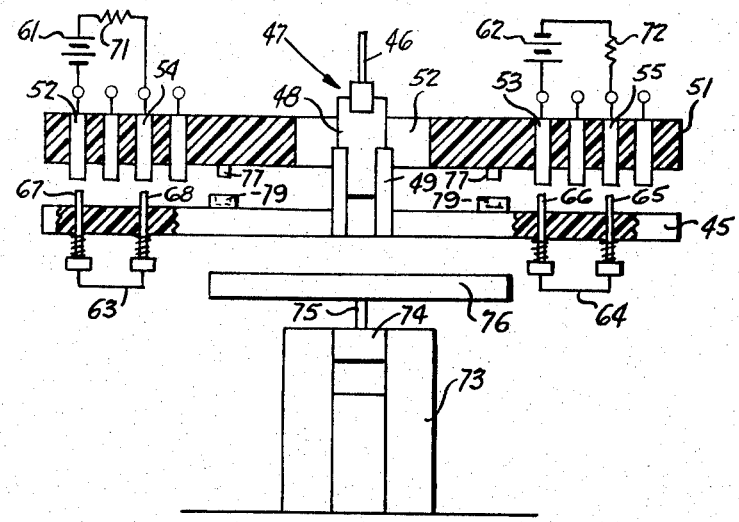
FIGURE 3 is a side sectional view taken through the lines 3—3 of FIGURE 3a, illustrating a preferred embodiment of the present invention, wherein contacts are selectively made through galvanic circuits.

Reference is now made in FIGURE 1 of the drawings wherein central station 11 and each of sub-stations 12–15 are connected with each other to monitor the meteorological and weather conditions existing over a predetermined area. Each of sub-stations 12–15 monitors the meteorological conditions in its own particular area and transmits the derived information in digital form, via Telex code, to central station 11. Sub-stations 12–15 periodically transmit the digital information to central station 11 or respond with a message when commanded by the central station via the line or radio link that connects them.

Reference is now made to FIGURE 2 of the drawings, a block diagram of a preferred embodiment of one of sub-stations 12–15. The sub-station illustrated in FIGURE 2 comprises power source 21 that may be in the form of a DC generator, battery, solar cell, etc. or an AC source in combination with a conventional rectifier that provides DC potentials for operating and energizing the various sub-station components. While energy source 21 is illustrated as being connected solely to bank of encoding relays 22 and control circuit 23, it is to be understood that a connection exists between the output of the energy source and each of the other elements, as needed.

The meteorological station also includes receiver 24 for demodulating the signal applied to it from central station 11 and for deriving signals for controlling operation of the sub-station in response to command signals deriving from the central station. In response to one of the several modulating command signals that may be received at the illustrated sub-station from central station 11, receiver 24 derives a control signal to activate starter circuit 25. When activated, starter circuit 25 supplies a signal to control circuit 23 whereby the voltages deriving from the bank of encoding relays 22 is supplied to transmitter 10. Simultaneously, control circuit 23 applies a pulse to programmer 26.

Programmer 26 is, in effect, an electronic commutator for selecively activating clock 27, dater 28 and analogue to digital converters 31–36 that respectively derive digital pulses indicative of atmospheric pressure, temperature, humidity, wind velocity, wind direction, and precipitation at the particular sub-station. Prior to activating any of readout devices 27, 28 or 31–36, programmer 26 supplies a signal to encoding matrix 37 via line 38 so that an indication of which sub-station, e.g. 12, 13, 14 or 15 is being monitored is supplied to central station 11. After the sub-station designation has been cleared through encoding matrix 37 and encoding relays 22, responsive to the matrix output, programmer 26 is automatically stepped to its second position and the first one of the eight lines 39 connected between it and elements 27, 28 and 31–36 is activated. Prior to activation of the first one of lines 39, a further control pulse is derived from programmer 26 on lead 38 to indicate that a clock or time indication is about to be derived. After this clock indicating control pulse subsides, programmer 26 is stepped to a position whereby the reading of clock 27 is translated into a digital signal that is supplied through encoding matrix 37 and encoding relays 22 to transmitter 10. In the encoding matrix 37, the digital signal is converted into Telex code, so that transmission can be effected over and between existing telegraphic receiving and transmitting equipment.

Clock 27 comprises a shaft rotation to digital code converter driven by a constant speed motor in a conventional manner by energy source 21. The clock output feeds, via suitable gearing, dater 28 that derives digital signals indicative of the month and day of the present reading. Subsequent to the hour being read from clock 27, programmer 26 is stepped to its next position whereby the month and day indicating signals derive from dater 28 are supplied through matrix 37 and relays 22 to transmitter 10.

Subsequent to reading out the date and hour information from elements 27 and 28, programmer 26 is stepped to its next position whereby a coded indication is provided therefrom on lead 38 that atmospheric pressure is about to be transmitted in digital form. After the signals are derived on lead 38, the programmer 26 is again stepped to its next position so that the reading of pressure gauge 31 is coupled in digital form to matrix 37 and hence to transmitter 10. The operation continues in this manner for each of the other monitored variables: temperature, humidity, wind velocity, wind direction and precipitation as derived from the transducers that feed analogue to digital converters 31–36. Since existing meters are available for indicating each of these parameters as a shaft rotation, all that need be provided in each of the analogue to digital converters 31–36 is a shaft rotation to digital converter. The shafts of these converters are driven by the same mechanisms that drive the electromechanical movements which provide visual indications of the monitored parameters.

It is thus seen that in response to a command signal from station 11 there is derived from transmitter 20 a carrier modulated in accordance with the digital data deriving from the various sub-station transducing elements, which data is converted from digital into Telex form by encoding matrix 37. A typical signal is in the following sequential form:

12 15:3 15 Jan; $P=62$; $T=21$; $H=53$;

$V=0.5$; $D=04$; $L=14$

The meaning of this exemplary message may be interpreted as follows:

The combination of the first two digits 12 serves to identify the sub-station;

The numbers 15:30 indicate the time of day as derived from clock 27; the letters and numbers 15 Jan indicate that the date is January 15 as derived from the dater 28; and The numbers associated with P, T, H, V, D & L represent atmospheric pressure, temperature, humidity, wind velocity, wind direction and precipitation at station 12, in appropriate units. Of course, it is to be understood that other parameters besides those enumerated may be monitored and transmitted.

According to a further mode of operation, each sub-station periodically transmits data. This is accomplished by energizing starter circuit 25 upon clock 27 achieving predetermined time positions. According to this mode of operation, once starter circuit 25 is activated the signals deriving from transmitter 20 are read out in exactly the same manner as that described when starter circuit 25 is activated in response to receiver 24.

Still another envisioned manner whereby the present invention operates is to provide each sub-station with a memory 41 for storing information to be transmitted. Under such circumstances, clock 27 periodically activates starter circuit 25 in the manner described in the previous paragraph. However, signals deriving from control circuit 23 are applied to memory circuit 41 rather than being coupled directly to transmitter 20. Only when receiver 24 is supplied with a command signal from central station 11 are the contents of memory 41 serially read out into transmitter 20.

Memory 41 is provided with plural sections, one for storing the indications deriving from each of transducers 27, 28 and 31–36 for each periodic activation of starter 25. When the command signal to read out memory 41 activates receiver 24 and memory 41 all of the previously stored information, over the interval existing from the preceding command signal, is destructively read out from the memory.

Figure 3A:
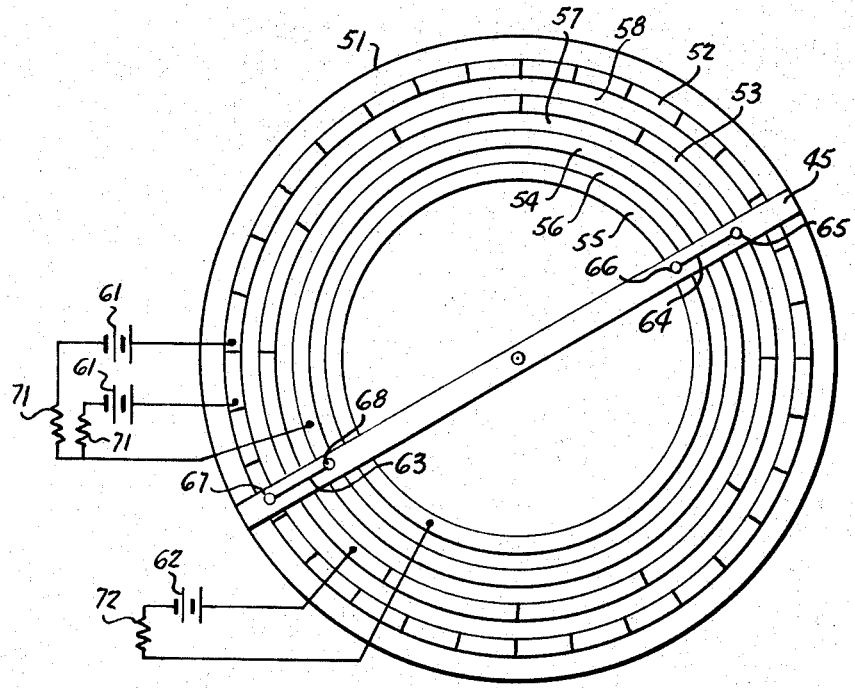
FIGURE 3a is a schematic representation of the rotatable contact-carrying arm in combination with the contact arrangement of the stationary disc in FIGURE 3.

Reference is now made to FIGURES 3 and 3a of the drawings wherein there is illustrated a prefered embodiment for each of the shaft rotations to digital converters 27, 28 and 31–36 at the sub-station of FIGURE 2. In FIGURE 3, insulating contact arm 45 is driven by shaft 46 of one of the analogue monitoring devices 27, 28 or 31–36 via coupling 47 that includes shaft 48 and sleeve 49. Positioned in a parallel plane above arm 45 is stationary, contact-carrying, insulating disc 51 having a central aperture 52 therein through which shaft 48 and sleeve 49 extend. The longitudinal axis of shaft 46 is coincident with the centers of arm 45 and disc 51.

As best viewed in FIGURE 3a, disc 51 includes four concentric conducting rings 52–55, insulated from each other by strips 56, 57 and 58. Rings 52 and 53 are respectively divided into 32 and 12 separate annular contacts that are insulated from each other, while each of rings 54 and 55 is a separate unitary annular conductor. The sub-divisions on conducting rings 52 and 53 are arranged to provide indicia or counts indicative of the units and tens orders, respectively. Associated with each of the contact areas on rings 52 and 53 is a separate D.C. source 61 or 62 (only a few of which are shown for simplicity) that is actually a part of encoding matrix 37.

Connections to the other ends of each of the supplies 61 or 62 are selectively established through jumper conductors 63 and 64, carried by arm 45, and rings 54 and 55. Jumper 64 is carried by and connected to contact pins 65 and 66 that are separated from shaft 46 by the same distance as rings 53 and 55, respectively. Contact pins 67 and 68 for providing indications of the units place, are likewise separated from shaft 46 by the same radial distance as rings 52 and 54; hence, pins 67 and 68 are at different radial locations from pins 55 and 56.

In the position illustrated in FIGURE 3, arm 45 is rotated relative to stationary disc 51 in response to turning of shaft 46 but no electric signal is derived to indicate shaft rotation since no circuits are established via sources 61 and 62 through their load resistors 71 and 72, respectively. When it is desired to read out the parameter being monitored, electromagnet 73, situated below arm 45, is activated in response to a signal deriving from programmer 26. Activation of electromagnet 73 results in upward transition of armature 74 that carries shaft 75 and disc 76, disposed in a plane parallel to arm 45 and disc 51. Disc 76 is translated sufficiently to engage the bottom surface of arm 45 and urge pins 65–68 into contact with rings 55, 53, 54, and 52, respectively.

When circular disc 76 engages arm 45, at any of its angular positions, pins 67 and 68 invariably engage only one segment on conducting rings 52 and 53. Ambiguous readings as can occur if either pins 67 or 68 bridges more than one segment on ring 52 or 53 are prevented by using guides 77 and 79. A separate one of guides 77 is located on the under surface of disc 51 at each intersection between two adjacent conducting segments of rings 52 and 53. Guides 77 are tapered to a line that is radially aligned with its respective intersection line between adjacent contact areas on rings 52 and 53. Since the pair of guides 79 and 79′ mounted on the upper surface of arm 45 at same radial position as guides 77, have a similar taper in an opposite direction, arm 45 is always rotated so that the guide tips are not in contact and pins 67 and 68 engage only one of the contact segments of rings 52 and 54 when electromagnet 73 is activated.

A brief description of the operation of the embodiment of FIGURES 3 and 3a will now be given. Shaft 46 is rotated in response to the analogue variable being monitored, e.g. time, temperature, to cause relative rotation between contact pins 65–68 and the conducting segments of rings 53–55. When it is desired to read out the digital value of the event being monitored, electromagnet 73 is energized causing circuit to be established between one of the conducting segments on ring 52 and common or return ring 56. This circuit is established via jumper 63 through the associated load resistor 71 and battery 61, whereby only one of the load resistors 71 is energized to provide a digital indication of the units value of the monitored parameter. Simultaneously, a circuit is established between only one of the contact areas on ring 53 and return ring 55 via jumper 64. This results in energization of only one of the decimal order indicating loads 72. The particular energized loads in the units and decimal orders are translated in matrix 37 into Telex code for transmisson to central station 11.

Of course, it is understood that each of the discs 51 may be provided with conducting rings 52 and 53 encoded originally in the Telex code. However, this is not particularly desirable because of the increased number of contacts that must be inclined on rotating arm 45 in such an instant. The specifically disclosed embodiment reduces the number of contacts on arm 45 to a minimum. Thereby, the weight of the arm is quite small and higher sensitivity than would be the case if the conducting segments 52 and 53 were included in Telex code is obtained.

Reference is now made in FIGURES 4 and 4a of the drawings wherein another embodiment of the analogue to digital converter is illustrated. In this embodiment there is provided an opaque disc 81, having five series of concentric indicia indicating apertures 82–86. Aligned with each one of aperture rings 82–86 is a separate photocell 91–95, respectively. Light from source 87 is projected through apertures in rings 82–86 to photo-cells 91–95, respectively, thereby providing an indication of the degree of rotation of disc 81 by shaft 46. Associated with each of photo-cells 91–95 is a separate housing having a lens for focusing light from source 87 on the photo-cell cathodes.

Because there are only five photo-cells monitoring each of the positions that disc 81 may assume, it is necessary to provide five separate tracks, not two as in the case embodiment illustrated in FIGURE 3, wherein a separate circuit is established for each contact. In consequence, disc 81 carried a direct indication of the Telex code and encoder matrix 37 is eliminated, the encoding relays in relay bank being activated directly in response to the on-off switching signals deriving from photo-cells 91–95.

However, the apparatus of FIGURES 4 and 4a is similar to that disclosed in FIGURES 3 and 3a, in the read-out element, disc 81, is activated into engagement with the lenses associated with each of photo-cells 91–95 in response to activation of electromagnet 73. When disc 81 is brought into engagement with the lenses of photo-cells 91–95, the disc is translated to a position whereby no ambiguity in reading occurs. This is accomplished by providing a guide, similar to guide 77 of FIGURE 3, adjacent to each aperture in rings 82–86, as well as by providing guides similar to guides 79 adjacent to each of the lenses provided for photo-cells 91–95.

Reference is now made to FIGURE 5 and 5a wherein a further embodiment of a photo-electric analogue to digital converter is illustrated. In the embodiment of FIGURE 5, disc 101 is provided with two concentric, indicia indicating apertured rings 102 and 103. Apertured ring 102 includes 24 equally spaced circular holes about the periphery of disc 101 while ring 103 includes four arcuate slots, each subtending an arc of approximately 80°. As in the embodiment of FIGURE 3, indicating disc 101 is stationary. Positioned at the same radial distance from the center of disc 101 apertures 102 are twenty-four, spaced arcuate photo-cells 104. Each of photo-cells 104 subtends an arc of approximately 14° so that a one-to-one correspondence between apertures 102 and photo-cell 104 may exist. In a similar manner, four arcuate photo-cells 105 are spaced from the center of disc 101 at the same radial distance as slots 103. Photo-cells 105 subtend substantially the same arc as slots 103 so that the same relationship may exist between them.

Positioned above apertured disc 101 are two pairs of light conducting rods 106–109. The ends of light conducting rods 106 and 107 extend radially and downwardly to a position immediately above apertured ring 102 while the ends of light conducting rods 108 and 109 are positioned immediately above ring 103. The ends of light conducting rods 106–109 remote from aperture disc 101 communicate with light deriving from lamp 111 in a plane parallel to disc 101.

Since light conducting rods 106–109 are rotated about the center of discs 101 in response to turning of shaft 46, the light intensity impinging upon photo-cells 104 and 105 is indicative of shaft 46 rotation in a manner similar to that in which galvanic contact is selectively established between each of the conducting segments of rings 52 and 53 in the embodiment of FIGURE 3. Photo-cells 104 and 105 thereby serve as switches for driving loads in exactly the same manner as that disclosed for the contact embodiment of FIGURE 3.

As in the embodiment of FIGURES 3 and 4, disc 101 is selectively translated into contact with readout elements 104 and 105, in response to activation of electromagnet 73. In the present instance, shaft 75 on armature 74 of electromagnet 73 is integral with disc 101 so that disc 101 is translated downwardly instead of upwardly, as in the case of FIGURE 3. Again, the readout elements 104 and 105 and disc 101 are provided with guides to prevent ambiguous readings.

Reference is now made to FIGURE 6 of the drawings wherein the modification of FIGURES 5 and 5a is disclosed in an embodiment including magnetically activated reed switches 111 and 112. A plurality of such switches, topologically arranged exactly as in the cases of photo-cells 104 and 105 of FIGURE 5a, is provided. Indicia indicating switches 111 and 112 are selectively activated in response to rotation of the shaft 46 that carry four permanent magnets 113-116 at radial positions corresponding with reed switches 111 and 112. As in the case of FIGURE 5, only four activators are necessary in combination with the 28 sensing elements 111 and 112.

As each of permanent magnets 113-116 comes in to proximity with a separate one of the magnetically responsive reed switches, the associated reed switch is activated. The distance between magnets 113-116 and reed switches 111 and 112 is sufficiently great when electromagnet 73 is not energized to prevent switch activation. Only when electromagnet 73 is energized to translate surface 117 that carries magnets 111 and 112 into close proximity with permanent magnets 113-116 do reed switches 111 and 112 become energized to activate encoder matrix 37 in a manner exactly like that by which the matrix is activated by establishing circuits between the conducting segments on rings 52, 54, 53, and 55.

As an auxiliary feature, a magnetic shield may be provided around each of magnetically responsive reed switches 111 and 112 to prevent spurious activation thereof.

While I have described and illustrated several specific embodiments of my invention, it will be clear that variations of the details of construction which are specifically illustrated and described may be resorted to without departing from the true spirit and scope of the invention as defined in the pending claims.

I claim:

1. In a system for automatically deriving coded signals from a meteorological station monitoring station monitoring analogue parameters such as temperature, humidity, atmospheric pressure, precipitation, wind velocity and wind direction, the improvement which comprises:
    a single encoding matrix for deriving a code signal;
    separate sensing systems associated respectively with shafts of each transducer, each of said sensing systems including
    a code bearing disc, and
    a readout activating element, said disc and said element being normally displaced from each other and rotatable by the respective shaft relative to each other; and
    means for sequentially displacing each of said output elements and said discs from the normal position thereof into operative relation relative to each other, said encoding matrix deriving a code signal as a result of said operative relation of the element and disc.

2. The system of claim 1 wherein each of said discs includes a plurality, n, of contact rings n/2 of said rings each being a unitary contact, the other n/2 of said rings having plural contact segments, said readout activating element including n/2 conducting elements bridging one of said plural contact segments with one of said other rings when said readout activating element and disc are displaced into operative relation.

3. The system of claim 2 wherein said disc is fixed with regard to rotation and said shaft rotates said readout element, said disc and element being provided with guides for preventing contact by said conducting elements with more than one segment on said plural contact segment rings.

4. The system of claim 1 wherein each of said readout activating means includes a light source and plural light detectors, and each of said discs includes a plurality of rings having indicia thereon for selectively coupling light from said source to said detectors, said detectors being radially aligned with said indicia.

5. The system of claim 4 wherein the number of detectors is equal only to the number of rings.

6. The system of claim 4 wherein the number of detectors is equal to the number of indicia on said disc, said detectors having the same topological configuration as said indicia.

7. The system of claim 6 wherein each of said indicia is a separate aperture through said disc, said detectors being located on one face of said disc, and light conducting rods coupling light from said source with said rings on the other face of said disc.

8. The system of claim 4 wherein said disc and said element are provided with guides for coupling light from said source to each of said detectors via only one of said indicia when said disc and readout activating element are in operative relation.

9. The system of claim 1 wherein each of said discs includes a plurality of magnetic field responsive switches, said switches being arranged in plural rings, each of said rings including multiple circumferentially disposed switches, and said readout activating means includes said plurality of permanent magnets, one of said magnets being aligned with each of said rings.

10. The system of claim 9 wherein means is provided for coupling the magnetic field from each of said magnets to only one of said switches when said disc and readout activating element are in operative relation.

11. The system of claim 1 wherein each of said discs includes plural indicia carrying rings, each of said rings being divided into multiple indicia indicating segments, each of said segments being circuit switching means, and said readout activating element includes plural means for selectively activating said switching means, said selectively activating means being radially aligned with each of said rings and extending over an arc not greater than the arc covered by the indicia of its respective ring.

12. The system of claim 11 wherein means are provided for coupling said switch means with only one of said segments when said disc and readout activating element are in operative relation.

13. A shaft rotation to coded signal converter comprising a readout activating element and a code bearing disc, said readout activating element and disc being rotated relative to each other in response to rotation of said shaft, said readout activating element and disc normally being displaced from each other in inoperative relation, means for at will displacing said element and disc into operative relation, said disc including plural indicia carrying rings, at least some of said rings being divided into multiple indicia indicating segments, each of said segments selectively activating circuit switching means, said readout activating element including plural means for selectively activating said segments, said selectively activating means being radially aligned with each of said rings and extending over an arc not greater than the arc covered by the indicia of its respective ring and means for coupling said switch activating means with only one of said segments when said disc and readout activating element are in operative relation.

14. A shaft rotation to coded signal converter comprising a light source, a light responsive readout activating element, a code bearing disc, said readout activating element and disc being rotated relative to each other in response to rotation of said shaft, said readout activating element and disc normally being displaced from each other in inoperative relation, means for at will displacing said element and disc into operative relation, said disc including plural indicia carrying rings, each of said rings being divided into multiple indicia indicating segments, each of said segments selectively coupling light between said source and said readout activating element, said readout activating element including plural means for selectively activating a switching means, said selectively activating means being radially aligned with each of said rings and extending over an arc not greater than the arc covered by the indicia of its respective ring.

15. The system of claim 1 wherein each of said readout activating means includes a light source and plural light detectors, and each of said discs includes a plurality of rings having indicia thereon for selectively coupling light from said source to said detectors, said detectors being radially aligned with said indicia.

16. The system of claim 15 wherein the number of detectors is equal only to the number of rings.

17. The system of claim 14 wherein the number of detectors is equal to the number of indicia on said disc, said detectors having the same topological configuration as said indicia.

18. The system of claim 17 wherein each of said indicia is a separate aperture through said disc, said detectors being located on one face of said disc, and light conducting rods coupling light from said source with said rings on the other face of said disc.

19. A shaft rotation to coded signal converter comprising a magnetic readout activating element and a code bearing disc including switches operated in response to magnetism deriving from said element, said readout activating element and disc being rotated relative to each other in response to rotation of said shaft, said readout activating element and disc normally being displaced from each other in inoperative relation, means for at will displacing said element and disc into operative relation, said disc including plural indicia carrying rings, each of said rings being divided into multiple indicia indicating segments, each of said segments being one of said switches, said readout activating element includes plural magnetic means for selectively activating said switches, said selectively activating means being radially aligned with each of said rings and extending over an arc not greater than the arc covered by the indicia of its respective ring and means for coupling said switch activating means with only one of said segments when said disc and readout activating elements are in operative relation.

20. In a shaft rotation to coded signal converter of the type which comprises a readout activating element and a code bearing disc having segments thereon which are relatively rotatable and normally spaced apart, and means for displacing said disc and element into operative signal deriving relationship, the improvement further comprising:

means for coupling said switch activating means with only one of said segments when said disc and readout activating element are in operative relation.

References Cited

UNITED STATES PATENTS

| | | | |
|---|---|---|---|
| 2,630,562 | 3/1953 | Johnson | 340—347 |
| 2,809,369 | 10/1957 | Feeney et al. | 340—347 |
| 3,041,599 | 6/1962 | Beaudette | 340—347 |
| 3,113,300 | 12/1963 | Sullivan | 340—347 |
| 3,237,012 | 2/1966 | Treffeisen | 250—219 |
| 3,247,505 | 4/1966 | Coyle | 340—347 |
| 3,253,260 | 5/1966 | Hawley | 340—151 |

MAYNARD R. WILBUR, *Primary Examiner.*

A. L. NEWMAN, J. M. WALLACE, *Assistant Examiners.*